United States Patent
Shan et al.

(10) Patent No.: US 8,135,417 B2
(45) Date of Patent: Mar. 13, 2012

(54) METHOD AND APPARATUS FOR ESTIMATING GEO-LOCATION OF TERMINAL WIRELESS COMMUNICATION SYSTEM

(75) Inventors: Cheng Shan, Suwon-si (KR);
Hyeon-Woo Lee, Suwon-si (KR);
Sung-Kwon Hong, Seoul (KR);
Do-Young Kim, Yongin-si (KR);
Eun-Taek Lim, Suwon-si (KR);
Jung-Soo Woo, Suwon-si (KR);
Deok-Ki Kim, Seongnam-si (KR);
Geun-Ho Lee, Suwon-si (KR); Yong-Ho Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 758 days.

(21) Appl. No.: 12/217,570

(22) Filed: Jul. 7, 2008

(65) Prior Publication Data
US 2009/0011774 A1    Jan. 8, 2009

(30) Foreign Application Priority Data
Jul. 6, 2007   (KR) .......................... 10-2007-0067848

(51) Int. Cl.
*H04Q 7/00*   (2006.01)

(52) U.S. Cl. ............... 455/456.5; 455/456.6; 455/550.1; 370/335

(58) Field of Classification Search ............... 455/456.5, 455/456.1, 550.1; 370/335
See application file for complete search history.

(56) References Cited

U.S. PATENT DOCUMENTS

| | | | | |
|---|---|---|---|---|
| 2002/0097702 A1* | 7/2002 | Take | ........................... | 370/342 |
| 2005/0058058 A1* | 3/2005 | Cho et al. | ..................... | 370/208 |
| 2006/0267841 A1 | 11/2006 | Lee et al. | | |
| 2007/0291680 A1* | 12/2007 | Machida | ..................... | 370/328 |
| 2009/0073916 A1* | 3/2009 | Zhang et al. | .................. | 370/315 |

FOREIGN PATENT DOCUMENTS

| | | |
|---|---|---|
| KR | 10-2006-0029760 | 4/2006 |
| KR | 10-2006-0122055 | 11/2006 |
| WO | WO 2007/103821 A2 | 9/2007 |

* cited by examiner

*Primary Examiner* — Danh Le (57) ABSTRACT

A method and apparatus for estimating a geo-location of a terminal in a wireless communication system are provided. In a method of operating a terminal for providing geo-location information in a cognitive ratio (CR) system, the method includes obtaining first ranging information and transmitting a first ranging code to a base station (BS) in a network entry process; receiving an allocated second ranging resource from the BS; and transmitting a second ranging code.

16 Claims, 11 Drawing Sheets

METHOD AND APPARATUS FOR ESTIMATING GEO-LOCATION OF TERMINAL WIRELESS COMMUNICATION SYSTEM

CROSS-REFERENCE TO RELATED APPLICATION(S) AND CLAIM OF PRIORITY

The present application claims priority under 35 U.S.C. §119(a) to a Korean patent application filed in the Korean Intellectual Property Office on Jul. 6, 2007 and assigned Serial No. 2007-67848, the entire disclosure of which is herein incorporated by reference.

TECHNICAL FIELD OF THE INVENTION

The present invention relates to a method and apparatus for estimating a geo-location of a terminal in a wireless communication system.

BACKGROUND OF THE INVENTION

With the development in mobile communication and wireless communication technologies, location information on mobile terminals and wireless terminals has become important. The location information of the terminal can be applied in various services. For example, a location finding service can be provided to find a variety of convenient facilities around a current location by using terminal positioning identification. Further, a location of a user or a friend can be found by examining a location of a target to be tracked. Furthermore, in businesses such as sales, insurance, call taxi, etc., a person or a vehicle which travels can be effectively deployed or managed by using the location information of the terminal. In addition, it can be used to inform guardians of current locations or movement paths of those who need care, such as, children, seniors, people with disabilities, etc. It can be also used to deal with accidents or disasters in an emergency situation. It can be also used to provide a user with traffic information, map information, and location information of surroundings according to a current location of a mobile terminal user. It can be also used to provide a variety of information regarding leisure facilities (e.g., amusement parks, tourist attractions, etc.).

In addition, in the wireless communication system, data can be reliably transmitted by using the geo-location information of the terminal before a base station (BS) schedules specific data traffic for the terminal. For example, in a cognitive radio (CR) system, BSs and terminals have to sense permitted frequency bands currently being used and perform communication by checking whether the frequency bands are permitted. In this case, if the CR system can know the geo-locations of the terminals in advance, it can determine connectivity of the terminals by using a specific time-frequency resource according to a specific spectrum policy without having to sense the permitted frequency bands. In addition, the location information of the terminal can be used to effectively schedule power and carriers for the terminals so that interference can be optimally minimized in the CR system itself. The location information of the terminal can also be used to estimate a level of interference towards coexisting wireless communication systems and to properly control power of terminals and scheduling.

At present, a location tracking function of a terminal can be implemented according to a method of using a cell location registered in a home location register (HLR) or a method of using location information based on a global positioning system (GPS). The method of using location information based on the GPS has a disadvantage in that the terminal needs to have an additional GPS function. The method of using cell location registered to the HLR without the GPS function has a disadvantage in that the location of the terminal cannot be accurately estimated. That is, a specific cell, in which the terminal is located, can be known whereas an exact location of that cell cannot be known.

In the CR system, a terminal, which is fixed in location during a call but is movable before and after the call, may coexist with a wired terminal which is fixed in location for a long period of time. A process of estimating a level of interference towards coexisting wireless communication systems is performed independently from a process of estimating the location of the terminal. That is, when the interference level is estimated, the location information of the terminal is provided according to a location estimation process which is defined to use the location information of the terminal. The provided location information of the terminal is simply obtained from a database such as the HLR. Therefore, the interference level cannot be accurately estimated since a movement state of the terminal is not taken into account.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide a method and apparatus for estimating a geo-location of a terminal in a wireless communication system.

In accordance with an aspect of the present invention, a method of operating a terminal for providing geo-location information in a cognitive radio (CR) system is provided. The method includes: transmitting a first ranging code to a base station (BS) in a network entry process; and transmitting a second ranging code when a resource for the second ranging code is allocated by the BS.

In accordance with another aspect of the present invention, a method of operating a neighbor terminal for providing geo-location information in a CR system is provided. The method includes: receiving allocation information regarding a second ranging code of a specific terminal from a BS; receiving the second ranging code of the specific terminal; estimating a distance to the specific terminal by using the received second ranging code; and transmitting information on the estimated distance to the BS.

In accordance with another aspect of the present invention, a method of operating a BS for estimating geo-location information of a terminal in a CR system is provided. The method includes: receiving a first ranging code from an access terminal in a network entry process; allocating a second ranging resource to the access terminal; and transmitting information on the second ranging resource to neighbor terminals of the access terminal.

In accordance with another aspect of the present invention, a terminal apparatus for providing geo-location information in a CR system is provided. The apparatus includes a controller for transmitting a first ranging code to a BS in a network entry process and for transmitting a second ranging code when a resource for the second ranging code is allocated by the BS.

In accordance with another aspect of the present invention, a neighbor terminal apparatus for providing geo-location information in a CR system is provided. The apparatus includes a controller for receiving allocation information regarding a second ranging code of a specific terminal from a BS, for receiving the second ranging code of the specific terminal, for estimating a distance to the specific terminal by using the received second ranging code, and for transmitting information on the estimated distance to the BS.

In accordance with another aspect of the present invention, a BS apparatus for providing geo-location information of a terminal in a CR system is provided. The apparatus includes: a controller for receiving a first ranging code from an access terminal in a network entry process and for transmitting information on a second ranging resource to neighbor terminals of the access terminal; and a scheduler for allocating the second ranging resource to the access terminal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, a method and apparatus for estimating geo-location information of a terminal in a wireless communication system will be described.

A cognitive radio (CR) system will be described with reference to FIG. 1 to FIG. 11. It will be assumed hereinafter that geo-location information of a terminal not having a GPS function is obtained by calculating a geo-location of the terminal, and a geo-location of a terminal having a GPS function is calculated by using the conventional GPS function. The present invention focuses on a fixed wireless communication system. The fixed wireless communication system represents a system in which the terminals are fixed in location while data is transmitted to and received from a base station (BS). Locations of the terminals may vary between two independent communication sessions. For example, when one communication session is established/terminated at an arbitrary location and thereafter another communication session is established, a location of a terminal may be different from a previous location. A terminal that attempts network entry by accessing to the BS will hereinafter be referred to as an access terminal.

Figure 1:
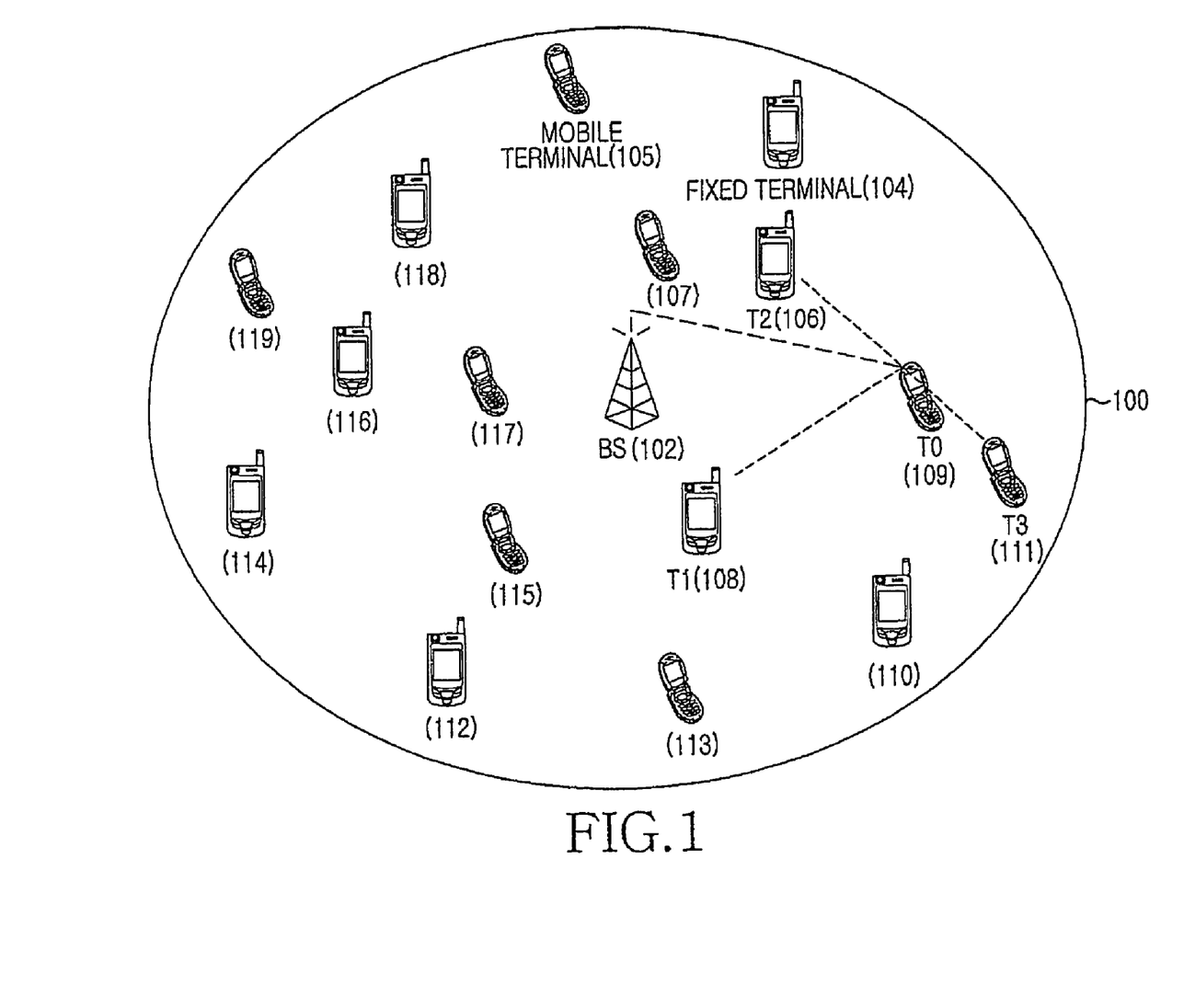
FIG. 1 illustrates an example of a cognitive radio (CR) system in which a plurality of terminals exist within one cell according to the present invention.

FIG. 1 illustrates an example of a CR system in which a plurality of terminals exist within one cell according to the present invention.

Referring to FIG. 1, in the CR system, a BS 102 senses a frequency band which is not used within a cell coverage 100 of the BS 102 among available frequency bands and thus communicates with a plurality of terminals 104 to 119. In the cell coverage 100, the terminals 104 to 119 establish link connections to communicate with the BS 102. A communication link from the BS 102 to the terminals 104 to 119 is referred to as a downlink (DL). A communication link from the terminals 104 to 119 to the BS 102 is referred to as an uplink (UL).

Now, a structure of a frame for transmitting data between the BS 102 and the terminals 104 to 119 will be described with reference to FIG. 2.

Figure 2:
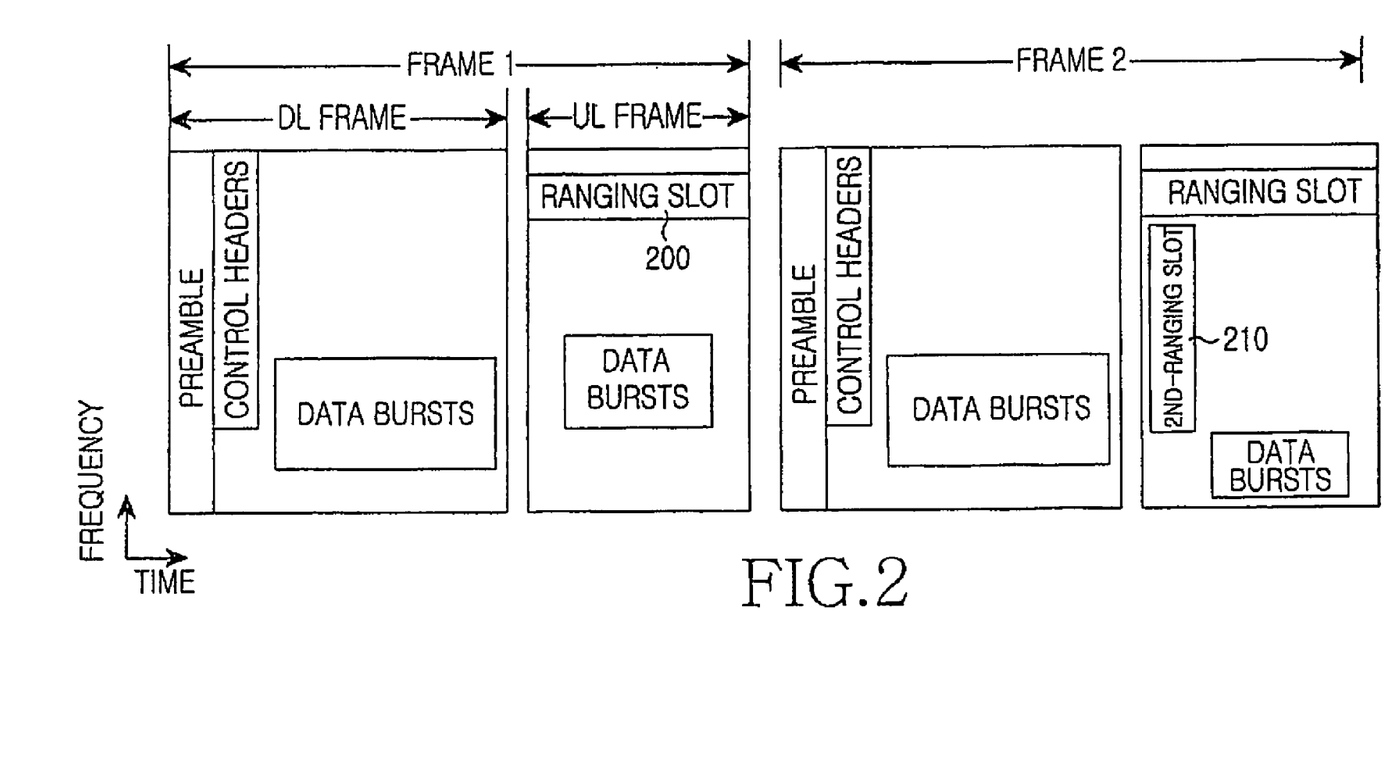
FIG. 2 illustrates an example of a frame structure according to the present invention.
Figure 3:
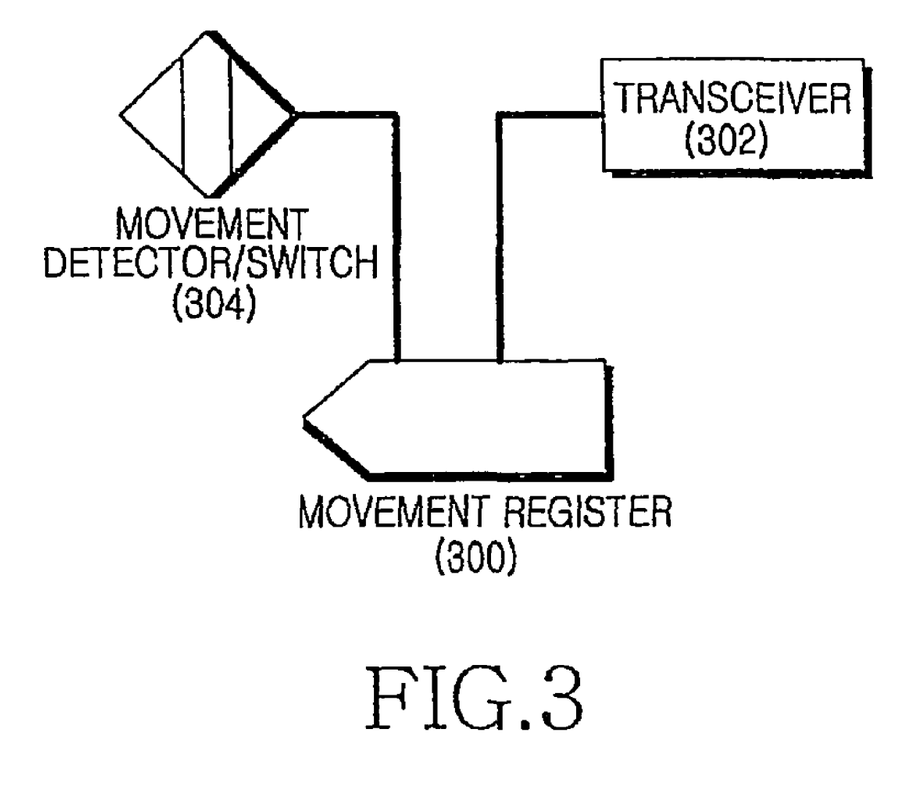
FIG. 3 illustrates an apparatus for informing a movement state by using a movement detector/switch according to the present invention.

FIG. 2 illustrates an example of a frame structure using a time division duplex (TDD) mode. A conventional TDD-based frame is composed of a sub-frame which is split into two parts, i.e., a DL frame and a UL frame, in that order. During the DL frame, the BS 102 can transmit data to the terminals 104 to 119, whereas during the UL frame, the terminals 104 to 119 can transmit data to the BS 102.

In the conventional DL frame, the BS 102 broadcasts a preamble so that the terminals 104 to 119 perform initial or periodic synchronization. Not only in the UL frame but also in the DL frame, the preamble is followed by control headers which indicate subcarrier allocation. An initial ranging slot 200 (hereinafter, initial ranging is also referred to as first ranging) is composed of one or more subchannels allocated in the conventional UL frame. The terminals 104 to 119 transmit a ranging code in a competitive manner for the purpose of initial ranging, periodic ranging, bandwidth request, etc. In addition to the first ranging slot 200, a second ranging slot 210 is defined in a UL region of a second frame in order to calculate geo-locations of the terminals 104 to 119.

In a process of estimating geo-locations of terminals according to an embodiment, it is assumed that the terminals 104 to 119 are fixed in location while the BS 102 communicates with the terminals 104 to 109. Alternatively, some terminals 104, 106, 108, 110, 112, 114, 116, and 118 are fixed always, whereas other terminals 105, 107, 109, 111, 113, 115, 117, and 119 are mobile. The geo-locations of the fixed terminals are registered in a database (not shown) that can be used by the BS 102. The geo-locations of the mobile terminals need to be determined when the terminals access to the network. That is, the BS 102 calculates geo-location information of the mobile terminals 105, 107, 109, 111, 113, 115, 117, and 119 and registers the information in the database. The geo-location information is used when power control is performed to reduce interference. For example, when the terminal 109 accesses to the network, the BS 102 can approximately predict a distance between the terminal 109 and BS 102 by using a ranging code transmitted through the first ranging slot 200. Thereafter, during a second ranging slot period, the neighbor terminals 106, 108, and 111 listen to the ranging code transmitted by the terminal 109 during the second ranging slot period, calculate a distance to the terminal 109, and report the calculation result to the BS 102. In this case, the BS 102 calculates an accurate geo-location of the terminal 109 by using distance information reported by the neighbor terminals 106, 108, and 111, the distance to the terminal 109, and the distance to each of the neighbor terminals 106, 108, and 111. An example of calculating the geo-locations will be described below with reference FIG. 5.

In addition, the BS 102 can manually receive fixed-location information of terminals from the fixed terminals 104, 106, 108, 110, 112, 114, 116, and 118 and store the received information in the database for future use if necessary. That is, there is no need to additionally calculate the locations of the fixed terminals. Alternatively, the BS 102 can receive the information from the terminals according to a predetermined procedure and store the information in the database. The BS 102 is fixed while communicating with the mobile terminals 105, 107, 109, 111, 113, 115, 117, and 119, but can move before or after communication and thus the location of the BS 102 may change. Therefore, in order for the BS 102 to calculate the geo-locations of the mobile terminals 105, 107, 109, 111, 113, 115, 117, and 119, information indicating whether to move is reported from the mobile terminals 105, 107, 109, 111, 113, 115, 117, and 119. To record the information indicating whether the mobile terminals 105, 107, 109, 111, 113, 115, 117, and 119 move, a special device is used in an integration manner with the terminals. For example, the special device may be an auto-sensor (i.e., a movement detector 304 of FIG. 3) that can detect movement of a terminal or an electro-mechanical switch 304 (see FIG. 3) that is switched when the terminal enters the network or departs from the network. Alternatively, a user can manually operate the switch 304 (see FIG. 3) when the user wants to move the terminal.

Figure 4:
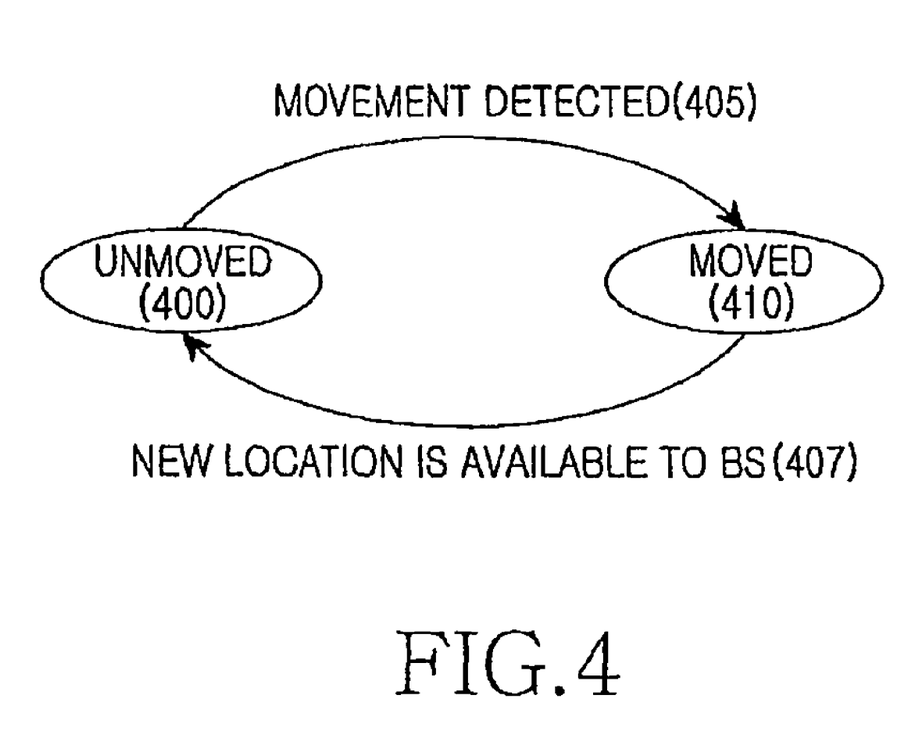
FIG. 4 illustrates a state transition diagram of a register in association with the movement detector/switch of FIG. 3.

A one (1) bit register 300 (see FIG. 3) records the movement of the terminal ever since the terminal has moved after the last communication is performed. When the movement of the terminal is detected by the auto-sensor or by the switch (as indicated 405 in FIG. 4), a register state is set to "moved" (indicated by 410 in FIG. 4). When communication is established with respect to the BS, a new geo-location is set to an available state (indicated by 407 in FIG. 4). In this case, the register state is transitioned to an "unmoved" state (indicated by 400 in FIG. 4). A state transition based on a state event of the one (1) bit register is shown in FIG. 4.

Figure 5:
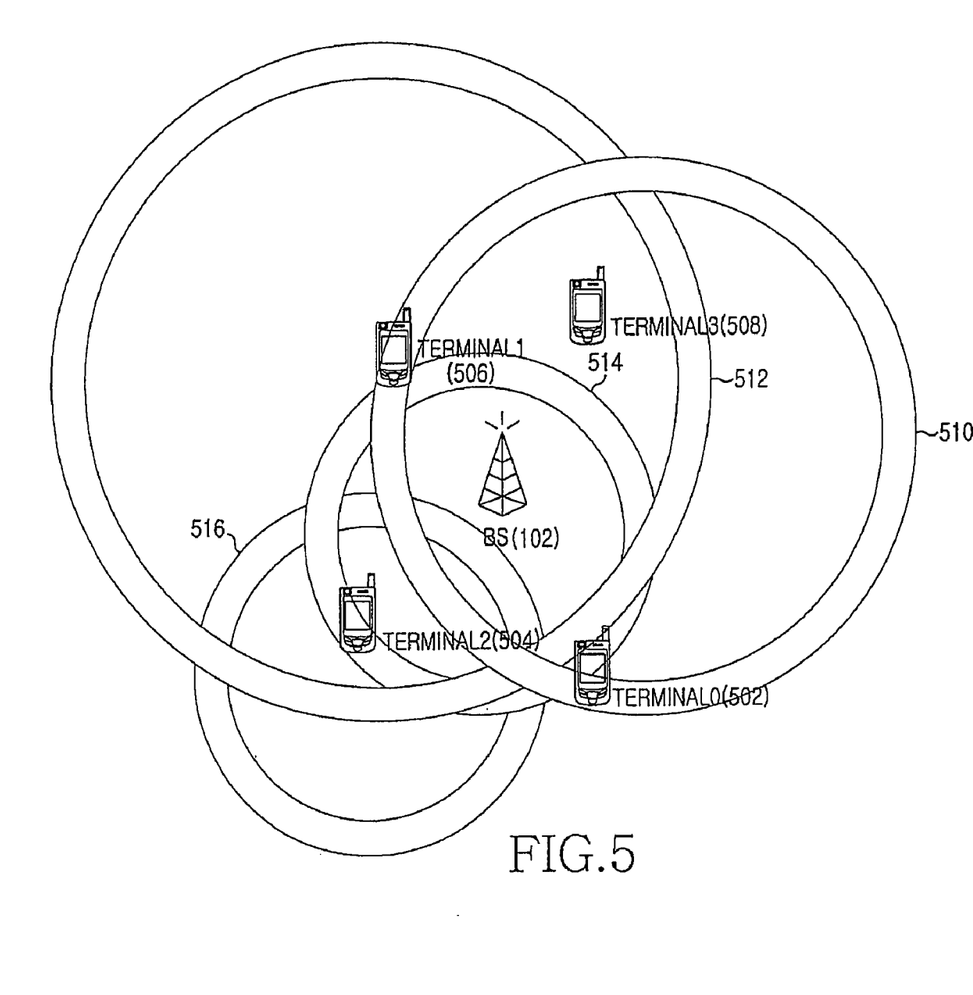
FIG. 5 illustrates an example of calculating geo-location information of an access terminal according to the present invention.

FIG. 5 illustrates an example of calculating a distance between a BS and a terminal by collecting distance information from neighbor terminals. In the example of FIG. 5, when a terminal 502 intends to access to the network, a BS 102 calculates geo-location information of the terminal 502 by collecting a distance to the terminal 502 and distance information received from neighbor terminals 504, 506, and 508. The distance information indicates a distance between the terminal 502 and each neighbor terminal.

Referring to FIG. 5, the BS 102 receives a first ranging code from the access terminal 502 and thus predicts the distance between the BS 102 and the terminal 502. Then, the BS 102 allocates resources for a second ranging code and thus collects the distance information from the neighbor terminals 504, 506, and 508. For example, while the terminal 502 transmits the second ranging code, the neighbor terminals 504, 506, and 508 listen to the second ranging code transmitted by the terminal 502, calculate the distance between the terminal 502 and each neighbor terminal, and report the calculation result to the BS 102. According to an embodiment, the neighbor terminals 504, 506, and 508 can transmit information required for distance calculation without having to calculate the distance to the terminal 502. As such, the BS 102 can calculate the distance.

By using the distance information reported by the terminal 502 and the neighbor terminals 504, 506, and 508, the BS 102 forms a circle 514 having a center at the location of the BS 102 and having a radius equal to the distance between the BS 102 and the terminal 502 and also forms a circle 516 having a center at the location of the terminal 504 and having a radius equal to the distance between the terminal 504 and the terminal 502. Likewise, the BS 102 forms a circle 512 having a center at the location of the terminal 506 and having a radius equal to the distance between the terminal 506 and the terminal 502 and also forms a circle 510 having a center at the location of the terminal 508 and having a radius equal to the distance between the terminal 502 and the terminal 508.

Thereafter, the BS 102 determines a point, at which the four circles intersect with one another, as the geo-location of the terminal 502.

Figure 6:
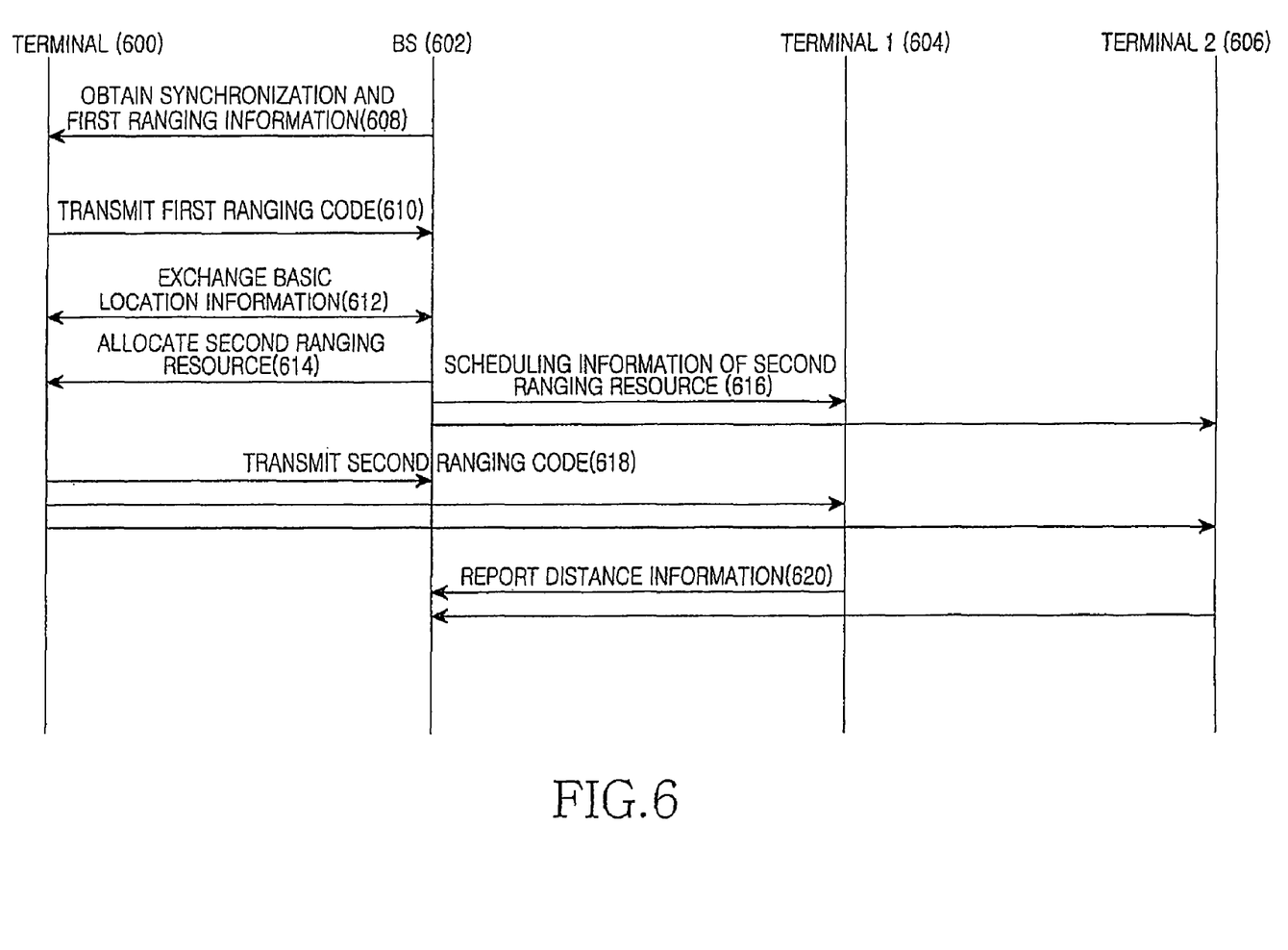
FIG. 6 is a flow diagram illustrating a process of determining a geo-location of a terminal in a CR system according to the present invention.

FIG. 6 is a flow diagram illustrating a process of determining a geo-location of a terminal in a CR system according to the present invention.

Referring to FIG. 6, an access terminal 600 searches for a preamble of a BS 602 to obtain synchronization in step 608. The terminal 600 obtains first ranging information and transmits a first ranging code in step 610. The terminal 600 uses control header information to know a location of a ranging slot in a UL frame. In this case, the terminal 600 transmits the first ranging code through the ranging slot. A plurality of access terminals compete to use the ranging slot. After receiving the first ranging code (or ranging signal) in step 610, the BS 602 informs the reception of the first ranging code or allows the terminal 600 to control power of the access terminals and synchronization.

After the ranging process, the BS 602 can approximately calculate a distance between the terminal 600 and the BS 602. An actual direction of the terminal 600 is not exactly determined yet.

To determine the actual direction, the BS 602 and the terminal 600 exchange basic location information in step 612. For example, after the first ranging process, the terminal 600 reports its unique identifier (e.g., a media access control (MAC) address) to the BS 602. Further, the terminal 600 reports to the BS 602 whether it is a fixed terminal or a mobile terminal or whether it has moved after the last communication.

If the location of the terminal 600 changes after the last communication, the BS 602 allocates resources by scheduling a second ranging slot for the terminal 600 in step 614. Then, in step 616, the terminal 600 selects neighbor terminals (i.e., a first terminal 604 and a second terminal 606) and provides the neighbor terminals with scheduling information of the second ranging slot. The neighbor terminals 604 and 606 assist a process of determining the location of the terminal 600. The BS 602 selects at least two terminals which assist the process of determining the location of the access terminal 600. A method of selecting the neighbor terminals that assist the process of determining the location of the access terminal is not within the scope of the present invention.

The BS 602 first schedules time-frequency resources within one of next UL frames for the access terminal 600. The resources correspond to ranging slots in the UL frame. According to an embodiment, the resource may be one or more sub-channels which are dedicatedly assigned to the terminals to avoid collision. Further, the BS 602 determines and indicates transmit power and a second ranging code to be used by the terminal 600. The second ranging code may be the same as the first ranging code. According to an embodiment, the second ranging code may be different from the first ranging code. In order to further accurately detect the ranging codes, a high-level modulation scheme (e.g., quadrature amplitude modulation (QAM)) may be used. The second ranging code and the modulation scheme are not within the scope of the present invention.

In addition to the transmit power and the second ranging code selected by the terminal 600, the BS 602 informs the neighbor terminals 604 and 606 of information regarding the time-frequency resources allocated to the terminal 600.

In step 618, the terminal 600 transmits the second ranging code to the neighbor terminals 604 and 606 and the BS 602 by using the allocated resources.

During the second ranging of the terminal 600, UL transmission is not scheduled by the neighbor terminals 604 and 606. That is, the neighbor terminals 604 and 606 listen to the second ranging code of the terminal 600 by using the allocated time resource.

In step 620, each of the neighbor terminals 604 and 606 receives the second ranging code from the terminal 600 and determines a distance to the terminal 600 through calculation. A distance calculation algorithm is not within the scope of the present invention. The BS 602 receives the second ranging code from the terminal 600 by using the allocated time-frequency resources. The BS 602 can update distance information of the terminal 600 from the newly received second ranging signal, wherein the distance information indicates a more accurate distance.

The first terminal 604 and the second terminal 606 report to the BS 602 their respective distances to the terminal 600. The BS 602 collects at least two distances (i.e., between the access terminal 600 and the first terminal 604, and between the access terminal 600 and the second terminal 606). In addition to the distance information of the terminal 600, which is reported to the BS 602, the BS 602 determines an actual distance to the terminal 600 by using location information of the first terminal 604 and the second terminal 606. The distance information cannot be reported when both the terminals 604 and 606 fail in transmission. In this case, the BS 602 may not be able to determine the accurate location of the terminal 600 due to improper communication sessions of the terminals 604 and 606. Therefore, the BS 602 independently schedules another geo-location ranging for the terminal 600, and recalculates a plurality of geo-locations by using a result obtained from the ranging process. An example of simple distance calculation is described in FIG. 5 above. A detailed algorithm for calculating the location of the terminal from mutual distance information of a plurality of terminals is not within the scope of the present invention.

After the geo-location of the terminal 600 is determined, the BS 602 can manage a specific bandwidth to avoid interference by using the geo-location information of the terminal 600. The terminal 600 terminates transmission and is disconnected from the BS 602. The BS 602 maintains the geo-location of the terminal 600 in the database for next transmission.

Thereafter, the procedure of FIG. 6 ends.

Figure 7:
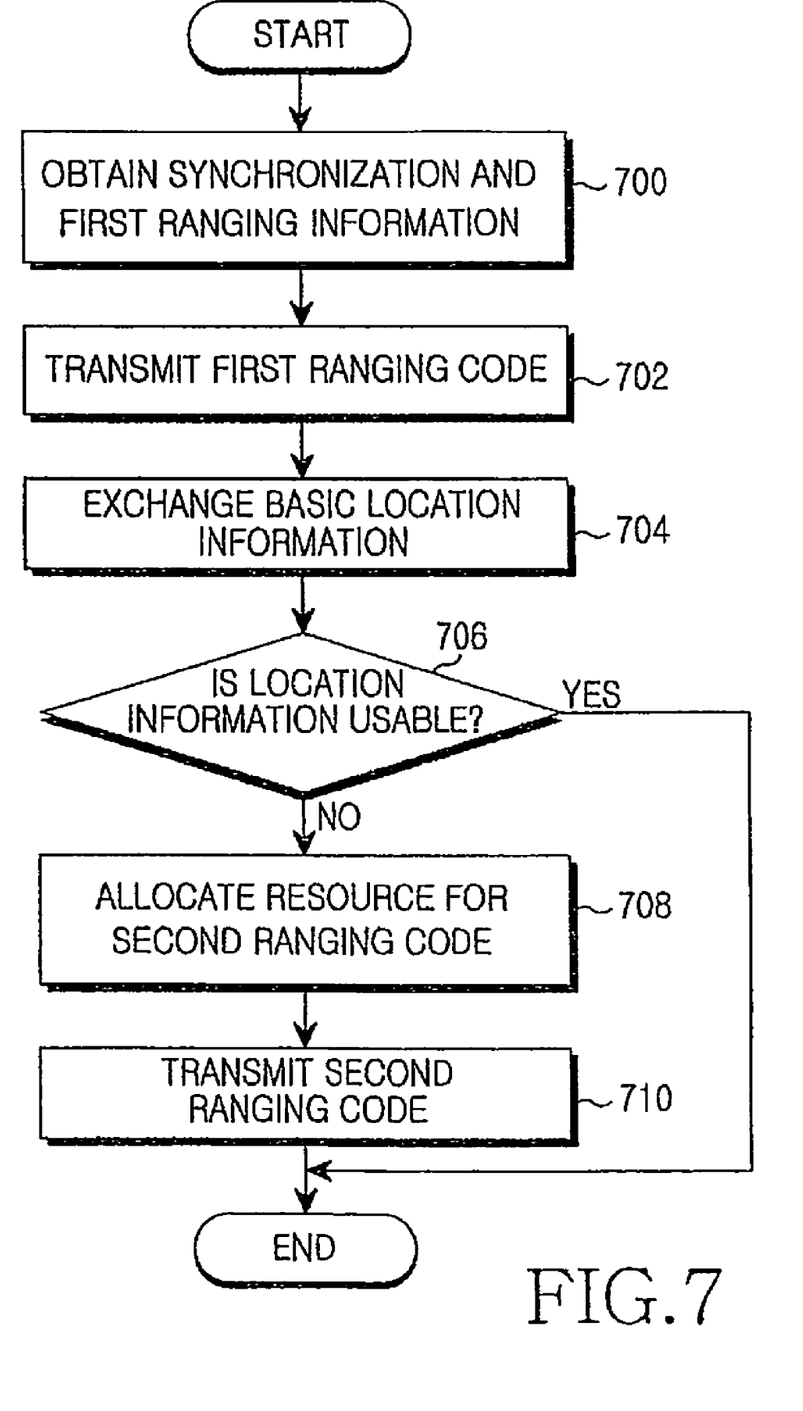
FIG. 7 is a flowchart illustrating an operation of a terminal that provides geo-location information in a CR system according to the present invention.

FIG. 7 is a flowchart illustrating an operation of a terminal that provides geo-location information in a CR system according to the present invention.

Referring to FIG. 7, an access terminal receives a preamble signal from a BS to obtain synchronization and decodes a DL-MAP to obtain competition-based ranging slot information for first ranging in step 700.

In step 702, the access terminal transmits a first ranging code through a ranging slot according to the ranging slot information.

In step 704, the access terminal exchanges basic location information with the BS in order to determine whether geo-location information can be immediately used. For example, when a terminal is fixed, location information stored in a database can be used without additionally having to update the geo-location information. When the terminal has moved after a previous call, the terminal informs the BS of a movement state. In this case, the location information stored in the database cannot be immediately used for the terminal, and the geo-location information of the terminal has to be updated.

In step 706, the access terminal determines usability of the location information by using the exchanged basic location information. If the location information cannot be immediately used, the BS allocates a resource for a second ranging code to the access terminal in step 708. Otherwise, if the location information can be immediately used, the access terminal receives and uses the location information stored in the database.

In step 710, by using the allocated resource, the access terminal transmits the second ranging code to the BS and to terminal selected from neighbor terminals.

Thereafter, the procedure of FIG. 7 ends.

Figure 8:
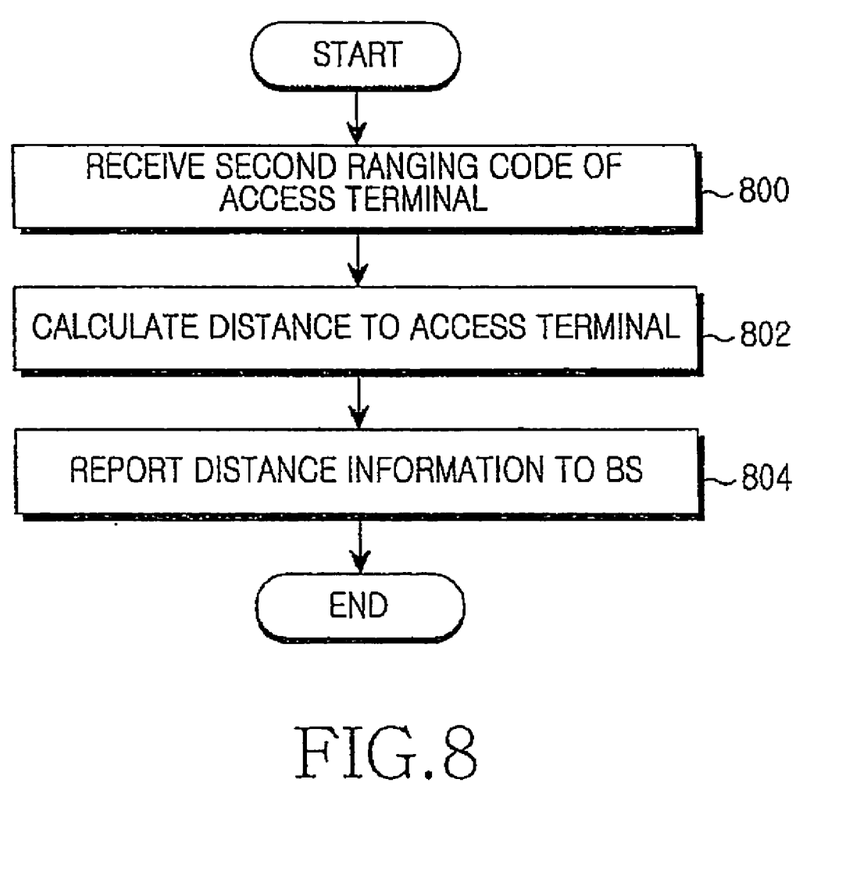
FIG. 8 is a flowchart illustrating an operation of a neighbor terminal that supports geo-location information in a CR system according to the present invention.

FIG. 8 is a flowchart illustrating an operation of a neighbor terminal that supports geo-location information in a CR system according to the present invention.

Referring to FIG. 8, in step 800, the neighbor terminal receives resource scheduling information of a second ranging code from a BS, and listens to the second ranging code while an access terminal receives the second ranging code.

In step 802, the neighbor terminal calculates a distance to the access terminal by using signal strength of the access terminal.

In step 804, the neighbor terminal reports information, which indicates the distance to the access terminal, to the BS.

Figure 9:
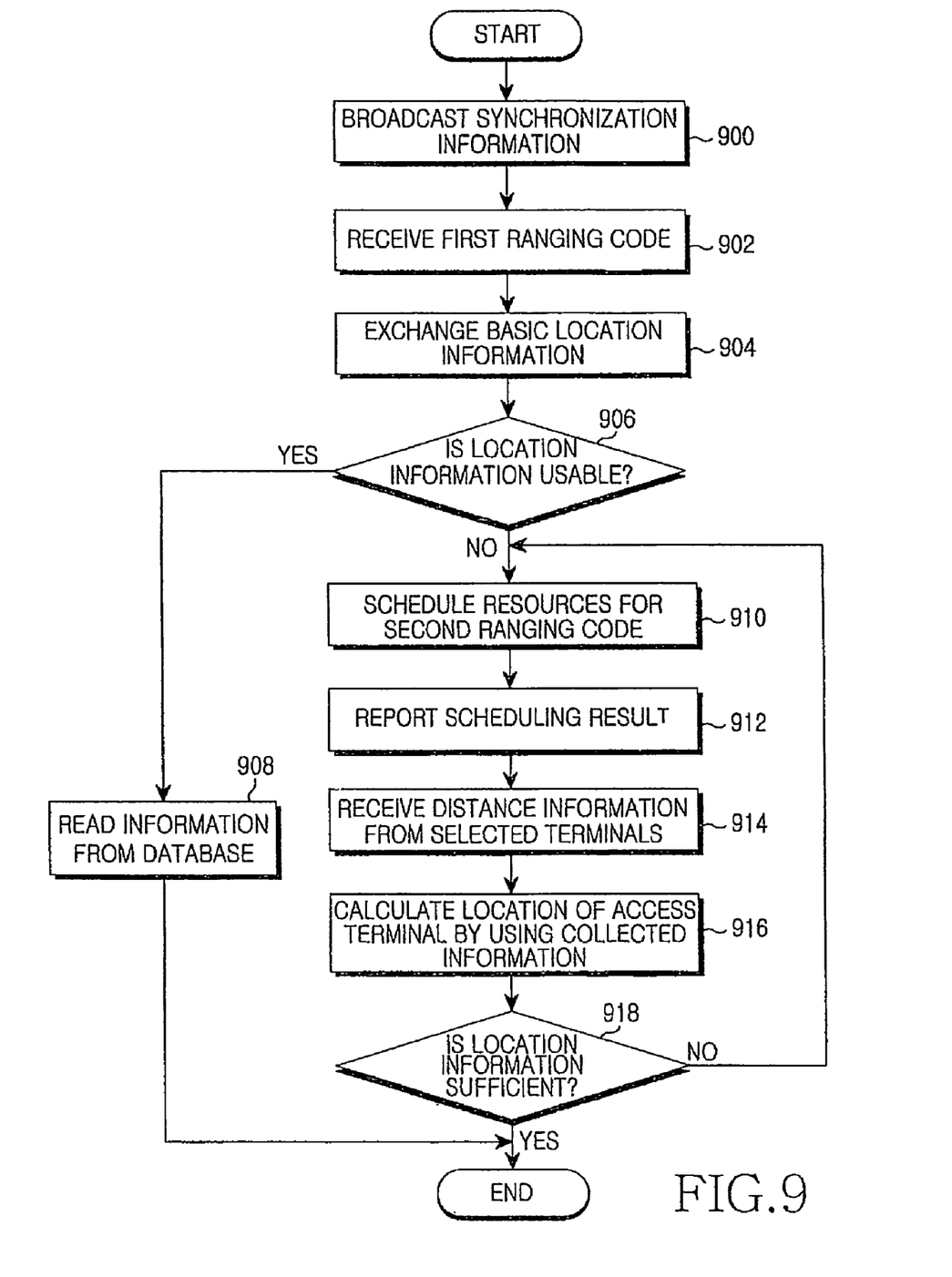
FIG. 9 is a flowchart illustrating an operation of a Base Station (BS) that determines geo-location information in a CR system according to the present invention.

FIG. 9 is a flowchart illustrating an operation of a BS that determines geo-location information in a CR system according to the present invention.

Referring to FIG. 9, the BS broadcasts synchronization information to terminals in step 900.

In step 902, the BS receives a first ranging code from an access terminal.

In step 904, the BS exchanges basic location information with the access terminal.

In step 906, the BS determines usability of location information by using the exchanged basic location information. If the location information can be immediately used, proceeding to step 908, the BS reads out geo-location information of the access terminal from a database if necessary.

On the other hand, if the location information cannot be immediately used in step 906, the BS schedules resources for a second ranging code in step 910.

In step 912, the BS allocates the scheduled resources to the access terminal and reports the scheduling result to terminals selected from neighbor terminals.

In step 914, the BS receives distance information from the selected terminals.

In step 916, the BS calculates the location of the access terminal by using the collected information.

In step 918, the BS determines whether the calculated location information is sufficient. If the calculated location information of the access terminal is insufficient, steps 910 to 916 are repeated.

Otherwise, if the location information of the access terminal is sufficient, the procedure of FIG. 9 ends.

Figure 10:
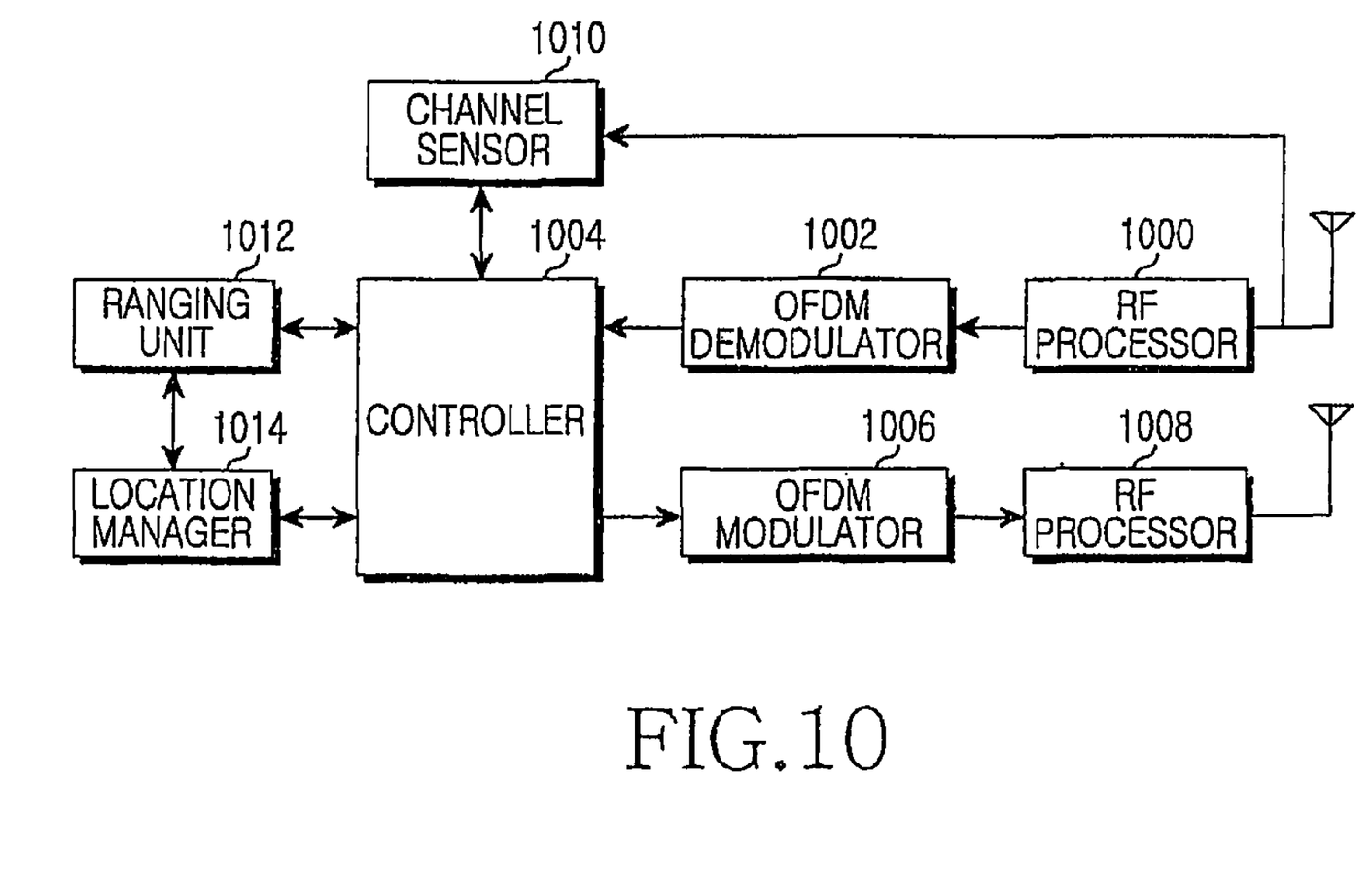
FIG. 10 is a block diagram of a terminal that provides geo-location information in a CR system according to the present invention.

FIG. 10 is a block diagram of a terminal that provides geo-location information in a CR system according to the present invention.

Referring to FIG. 10, the terminal includes a Radio Frequency (RF) processor 1000, an orthogonal frequency division multiplexing (OFDM) demodulator 1002, a controller 1004, an OFDM modulator 1006, an RF processor 1008, a channel sensor 1010, a ranging unit 1012, and a location manager 1014.

The RF processor 1000 converts an RF signal received through an antenna into a baseband analog signal. The OFDM demodulator 1002 converts the analog signal received from the RF processor 1000 into sample data. Further, the OFDM demodulator 1002 converts the sample data into frequency-domain data by performing fast fourier transform (FFT), and selects subcarrier data, which is to be received in practice, from the frequency-domain data. According to an embodiment, the OFDM demodulator 1002 demodulates and decodes data according to a predetermined modulation and coding scheme (MCS) level, and outputs the resultant data to the controller 1004.

The controller 1004 processes information provided from the OFDM demodulator 1002 and outputs the processed information to the OFDM modulator 1006 in a physical layer. Further, the controller 1004 receives a result of signal detection from the channel sensor 1010 and determines an available frequency band to be used in data transmission. In addition thereto, the controller 1004 receives a first ranging code and a second ranging code from the ranging unit 1012 and thus controls a ranging process for a BS. The second ranging code is used when a geo-location of the terminal is determined. When the terminal is not an access terminal but an assistant terminal which assists the calculation of the geo-location of the terminal, a distance to the access terminal is calculated by receiving the second ranging code from the access terminal and the calculation result is stored in the location manager 1014.

The OFDM modulator 1006 receives data from the controller 1004, and codes and modulates the data according to the predetermined MCS level. Further, the OFDM modulator 1006 converts the modulated data into sample data (i.e., an OFDM symbol) by using inverse fast fourier transform (IFFT). The sample data is converted into an analog signal and is then output to the RF processor 1008. The RF processor 1008 converts the analog signal into an RF signal and transmits the RF signal through an antenna.

The controller 1004 may receive information required in a communication protocol process from a specific entity of the physical layer or may generate a control signal by using the entity of the physical layer.

The channel sensor 1010 detects a signal from a receive antenna and provides the detection result to the controller 1004.

The ranging unit 1012 generates the first ranging code under the control of the controller 1004 and outputs the generated first ranging code to the controller 1004. If the location of the terminal changes due to movement of the terminal, the OFDM demodulator 1002 generates the second ranging code and outputs the generated second ranging code to the controller 1004.

The location manager 1014 includes an auto-sensor/switch for detecting a movement state and also includes a register for storing the movement state. The location manager 1014 determines the movement state of the terminal under the operation of the auto-sensor (or switch), stores the movement state (i.e., "moved" or "unmoved") in the one (1) bit register, and reports the movement state to the BS.

Figure 11:
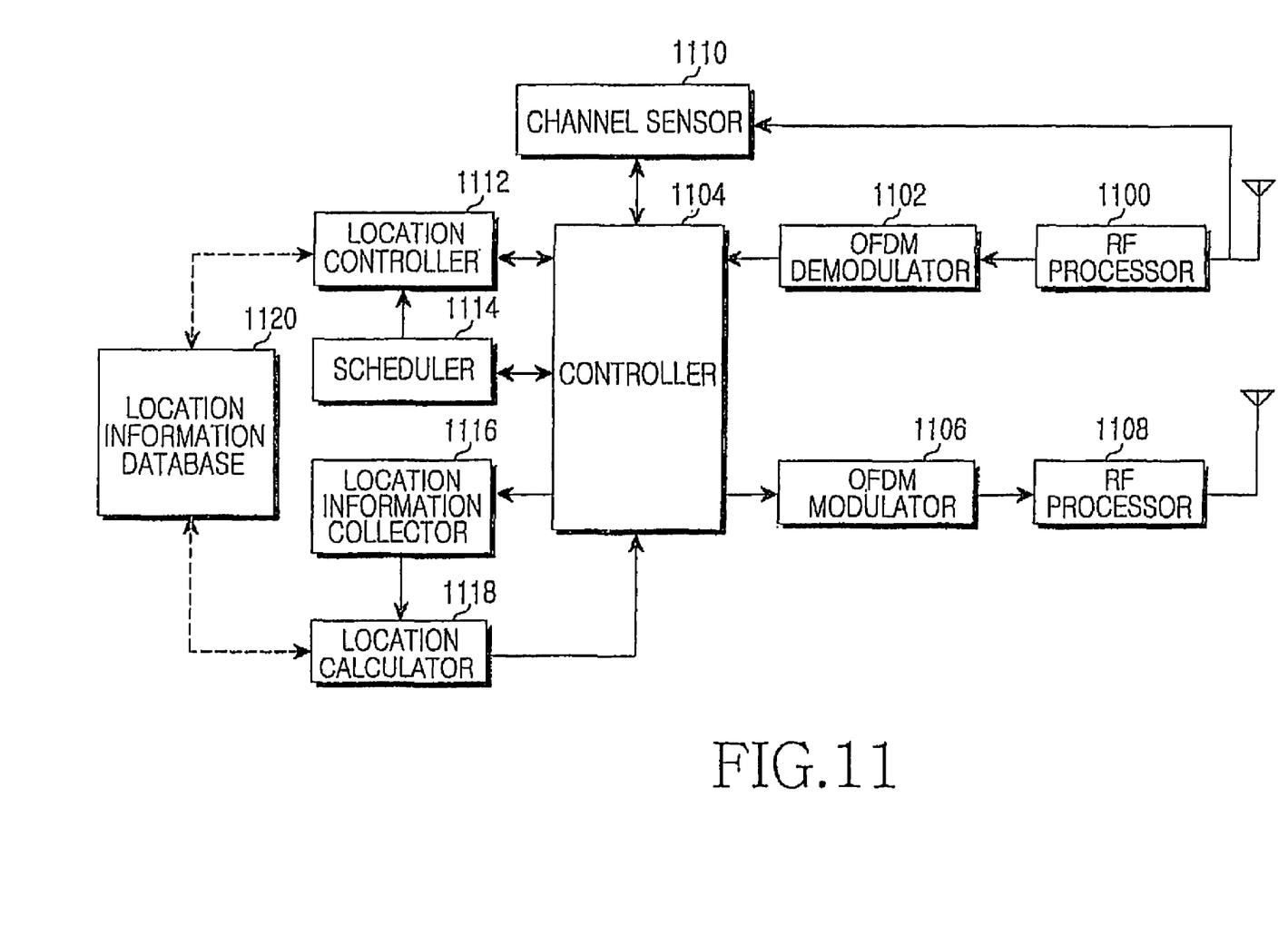
FIG. 11 is a block diagram of a BS that determines geo-location information in a CR system according to the present invention.

FIG. 11 is a block diagram of a BS that determines geo-location information in a CR system according to the present invention.

Referring to FIG. 11, the BS includes an RF processor 1100, an OFDM demodulator 1102, a controller 1104, an OFDM modulator 1106, an RF processor 1108, a channel sensor 1110, a location controller 1112, a scheduler 1114, a location information collector 1116, and a location calculator 1118.

The RF processor 1100, the OFDM demodulator 1102, the controller 1104, the OFDM modulator 1106, the RF processor 1108, and the channel sensor 1110 are the same as those described in FIG. 10 in terms of functions and operations. Thus, detailed descriptions thereof will be omitted.

The location controller 1112 exchanges basic location information with a terminal. Thereafter, the location controller 1112 determines whether the location information can be immediately used, and provides the determination result to the scheduler 1114. Further, the location controller 1112 selects at least two or more terminals that assist a process of determining the geo-location of the terminal, and provides the selection result to the scheduler 1114.

The scheduler 1114 schedules resources for transmitting a second ranging code according to the result provided from the location controller 1112, and allocates the resources to the terminal. That is, when the location information can be immediately used, the scheduler 1114 does not have to schedule the resources for the second ranging code. When the location information cannot be immediately used due to the movement of the terminal, the scheduler 1114 schedules the resources for the second ranging code.

The location information collector 1116 collects a distance to the access terminal. The geo-location of the access terminal, which is selected by the location controller 1112, is determined by the aid of neighbor terminals. The location information collector 1116 collects information on a distance between the access terminal and each neighbor terminal from the neighbor terminals.

The location calculator 1118 receives distance information from the location information collector 1116 and calculates the location of the access terminal. An example of calculating the location has been shown in FIG. 5.

A location information database 1120 receives the geo-location information of the terminal from the location controller 1112 and the location calculator 1118 and then stores the received information. According to an embodiment, the location information database 1120 may be included in the BS or may be provided in a separate device independent from the BS.

In the aforementioned structure, as protocol controllers, the controllers 1004 and 1104 control the channel sensors 1010 and 1110, the ranging unit 1012, the location manager 1014, the location controller 1112, the scheduler 1114, the location information collector 1116, and the location calculator 1118. That is, the controllers 1004 and 1104 can perform functions of the channel sensors 1010 and 1110, the ranging unit 1012, the location manager 1014, the location controller 1112, the scheduler 1114, the location information collector 1116, and the location calculator 1118. Although these elements are distinctively implemented in the present invention, this is only to explain functions of the elements. Thus, in practice, the controllers 1004 and 1104 may perform all or some of the functions.

An example of estimating geo-location information of a terminal not having a global positioning system (GPS) function in a CR system has been described in the aforementioned embodiment. In addition thereto, the same method may also be used to estimate geo-location information of a terminal in other wireless communication systems (e.g., broadband wireless communication system, etc.)

According to the present invention, at least two terminals that assist estimation of geo-location of terminals are selected in a CR system, and thereafter distance information is measured by using a second ranging code. Therefore, there is an advantage in that geo-location information of a terminal not having a GPS function can be obtained in a ranging process. In addition, the geo-location information of the terminal not having the GPS function can be reliably estimated.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of operating a base station for estimating geo-location information of a terminal in a communication system, the method comprising:
   receiving a first ranging code from an access terminal in a network entry process;
   allocating a ranging resource to the access terminal;
   transmitting information on the ranging resource to neighbor terminals of the access terminal; and
   receiving information indicating a distance between the access terminal and each neighbor terminal from the access terminal and the neighbor terminals.

2. The method of claim 1, further comprising receiving a second ranging code in association with the ranging resource.

3. The method of claim 1, further comprising estimating a distance to the access terminal by receiving the first ranging code.

4. The method of claim 1, further comprising updating geo-location information of the access terminal by using the distance between the access terminal and each neighbor terminal and the distance between the access terminal and the base station.

5. The method of claim 1, wherein a second ranging code is allocated when the location information of the access terminal is modified.

6. The method of claim 1, wherein a second ranging code is not allocated when the access terminal is a fixed terminal.

7. The method of claim 1, wherein the access terminal transmits the first ranging code to the base station and transmits the second ranging code when a resource for the second ranging code is allocated by the base station.

8. The method of claim 1, wherein the neighbor terminal receives allocation information regarding the second ranging code of the access terminal from the base station, the method further comprising:
   receiving the second ranging code of the access terminal;
   estimating a distance between the access terminal and the neighbor terminal by using the received second ranging code; and
   transmitting information associated with the estimated distance to the base station.

9. A base station apparatus for providing geo-location information of a terminal in a communication system, the apparatus comprising:
   a controller configured to receive a first ranging code from an access terminal in a network entry process and transmit information on a ranging resource to neighbor terminals of the access terminal; and
   a scheduler configured to allocate the ranging resource to the access terminal,
   wherein the controller is further configured to receive information indicating a distance between the access terminal and each neighbor terminal from the access terminal and the neighbor terminals.

10. The apparatus of claim 9, wherein the controller receives a second ranging code.

11. The apparatus of claim 9, further comprising a location information calculator for estimating a distance to the access terminal by receiving the first ranging code.

12. The apparatus of claim 9, further comprising a location controller for updating geo-location information of the access terminal by using the distance between the access terminal and each neighbor terminal and the distance between the access terminal and the base station.

13. The apparatus of claim 9, wherein a second ranging code is allocated when the location information of the access terminal is modified.

14. The apparatus of claim 9, wherein a second ranging code is not allocated when the access terminal is a fixed terminal.

15. The apparatus of claim 9, wherein the access terminal transmits the first ranging code to the base station and transmits the second ranging code when a resource for the second ranging code is allocated by the base station.

16. The apparatus of claim 9, wherein the neighbor terminal receives allocation information regarding the second ranging code of the access terminal from the base station, the controller further configured to:
   receive the second ranging code of the access terminal;
   estimate a distance between the access terminal and the neighbor terminal by using the received second ranging code; and
   transmit information associated with the estimated distance to the base station.

* * * * *